(12) United States Patent
Chawla (10) Patent No.: US 10,999,802 B2
(45) Date of Patent: *May 4, 2021

(54) REAL-TIME LOCATION AND PRESENCE USING A PUSH-LOCATION CLIENT AND SERVER

(71) Applicant: mPanion, Inc., Bothell, WA (US)

(72) Inventor: Neeraj Chawla, Bothell, WA (US)

(73) Assignee: MPANION, INC., Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/420,273

(22) Filed: May 23, 2019

(65) Prior Publication Data

US 2019/0281553 A1 Sep. 12, 2019

Related U.S. Application Data

(60) Division of application No. 15/956,924, filed on Apr. 19, 2018, now Pat. No. 10,334,532, which is a
(Continued)

(51) Int. Cl.
*H04W 52/02* (2009.01)
*G01S 19/34* (2010.01)
(Continued)

(52) U.S. Cl.
CPC ......... *H04W 52/0258* (2013.01); *G01S 19/34* (2013.01); *G01S 19/48* (2013.01);
(Continued)

(58) Field of Classification Search
CPC ... G06Q 30/0269; H04W 4/027; H04W 64/00
(Continued)

(56) References Cited

U.S. PATENT DOCUMENTS

| 5,946,647 A | 8/1999 | Miller et al. |
| 6,055,513 A | 4/2000 | Katz et al. |

(Continued)

FOREIGN PATENT DOCUMENTS

| EP | 1418784 A1 | 5/2004 |
| JP | 2002334030 A | 11/2002 |

(Continued)

OTHER PUBLICATIONS

An Exploration on Mobile Social Networking: Dodgeball as a Case in Point, Nina Ziv et al., Mobile Business, 2006, ICMB '06, International Conference of IEEE Computer Society, p. 21, XP031056542, DOI: 10.1109/ICMB.2006.8, ISBN: 978-0-7695-2595-2 (Jun. 1, 2006).

(Continued)

*Primary Examiner* — Kiet M Doan
(74) *Attorney, Agent, or Firm* — LeonardPatel PC; Michael A. Leonard, II; Sheetal S. Patel (57) ABSTRACT

A system for providing real-time always-on location is presented for maintaining the current location of a mobile device, while saving the battery by managing the GPS in a power-saving mode while the device is considered to be stationary. The system also provides a real-time location in an indoor environment where a GPS signal may not be available. Additionally, methods for driving detection are also presented.

19 Claims, 8 Drawing Sheets

Related U.S. Application Data continuation of application No. 14/619,136, filed on Feb. 11, 2015, now Pat. No. 9,980,231, which is a continuation of application No. 13/923,722, filed on Jun. 21, 2013, now Pat. No. 8,965,464, which is a continuation of application No. 12/728,216, filed on Mar. 20, 2010, now Pat. No. 8,489,111, which is a continuation-in-part of application No. 11/838,876, filed on Aug. 14, 2007, now Pat. No. 8,050,690.

(60) Provisional application No. 61/162,263, filed on Mar. 21, 2009.

(51) Int. Cl.
*G01S 19/48* (2010.01)
*H04W 64/00* (2009.01)

(52) U.S. Cl.
CPC ... *H04W 52/0251* (2013.01); *H04W 52/0254* (2013.01); *H04W 64/006* (2013.01); *H04W 52/0274* (2013.01); *Y02D 30/70* (2020.08)

(58) Field of Classification Search
USPC ........ 340/12.32; 455/457, 402, 456.1, 422.1, 455/436, 69, 343.2, 560, 456.3, 411
See application file for complete search history.

(56) References Cited

U.S. PATENT DOCUMENTS

| | | | |
|---|---|---|---|
| 6,057,872 | A | 5/2000 | Candelore |
| 6,101,484 | A | 8/2000 | Halbert et al. |
| 6,157,841 | A | 12/2000 | Bolduc et al. |
| 6,269,343 | B1 | 7/2001 | Pallakoff |
| 6,295,528 | B1 | 9/2001 | Marcus et al. |
| 6,381,303 | B1 | 4/2002 | Vu et al. |
| 6,385,458 | B1 | 5/2002 | Papadimitriou et al. |
| 6,400,956 | B1 | 6/2002 | Richton |
| 6,442,391 | B1 | 8/2002 | Johansson et al. |
| 6,442,530 | B1 | 8/2002 | Miller |
| 6,446,004 | B1 | 9/2002 | Cao et al. |
| 6,452,498 | B2 | 9/2002 | Stewart |
| 6,505,123 | B1 | 1/2003 | Root et al. |
| 6,515,619 | B1 | 2/2003 | McKay |
| 6,542,820 | B2 | 4/2003 | Lamance et al. |
| 6,556,975 | B1 | 4/2003 | Wittsche |
| 6,560,534 | B2 | 5/2003 | Abraham et al. |
| 6,587,835 | B1 | 7/2003 | Treyz et al. |
| 6,611,751 | B2 | 8/2003 | Warren |
| 6,631,404 | B1 | 10/2003 | Philyaw |
| 6,647,257 | B2 | 11/2003 | Owensby |
| 6,651,000 | B2 | 11/2003 | Van Diggelen et al. |
| 6,668,167 | B2 | 12/2003 | Mcdowell et al. |
| 6,754,585 | B2 | 6/2004 | Root et al. |
| 6,756,882 | B2 | 6/2004 | Benes et al. |
| 6,756,917 | B2 | 6/2004 | Gould et al. |
| 6,760,046 | B2 | 7/2004 | I Anson et al. |
| 6,760,601 | B1 | 7/2004 | Suoknuuti et al. |
| 6,763,299 | B2 | 7/2004 | Jones |
| 6,763,300 | B2 | 7/2004 | Jones |
| 6,764,003 | B1 | 7/2004 | Martschitsch et al. |
| 6,788,766 | B2 | 9/2004 | Logan |
| 6,826,617 | B1 | 11/2004 | Ansell et al. |
| 6,829,535 | B2 | 12/2004 | Van Diggelen et al. |
| 6,836,730 | B2 | 12/2004 | Root et al. |
| 6,839,554 | B2 | 1/2005 | Mcdowell et al. |
| 6,847,959 | B1 | 1/2005 | Arrouye et al. |
| 6,850,837 | B2 | 2/2005 | Paulauskas et al. |
| 6,868,396 | B2 | 3/2005 | Smith et al. |
| 6,871,140 | B1 | 3/2005 | Florance et al. |
| 6,873,997 | B1 | 3/2005 | Majjasie et al. |
| 6,912,398 | B1 | 6/2005 | Domnitz |
| 6,912,517 | B2 | 6/2005 | Agnihotri et al. |
| 6,931,254 | B1 | 8/2005 | Egner et al. |
| 6,937,998 | B1 | 8/2005 | Swartz et al. |
| 6,944,467 | B2 | 9/2005 | Ala-Luukko |
| 6,944,679 | B2 | 9/2005 | Parupudi et al. |
| 6,947,976 | B1 | 9/2005 | Devitt et al. |
| 6,954,633 | B1 | 10/2005 | Metternich et al. |
| 6,954,697 | B1 | 10/2005 | Smith |
| 6,957,393 | B2 | 10/2005 | Fano et al. |
| 6,965,868 | B1 | 11/2005 | Bednarek |
| 6,965,872 | B1 | 11/2005 | Grdina |
| 6,973,322 | B2 | 12/2005 | Buchmann et al. |
| 6,973,438 | B1 | 12/2005 | Philyaw |
| 6,975,872 | B2 | 12/2005 | Cheng |
| 6,983,146 | B2 | 1/2006 | Spratt |
| 6,985,813 | B2 | 1/2006 | Root et al. |
| 6,988,037 | B2 | 1/2006 | Root et al. |
| 6,992,617 | B2 | 1/2006 | Diggelen et al. |
| 6,996,402 | B2 | 2/2006 | Logan et al. |
| 6,996,579 | B2 | 2/2006 | Leung et al. |
| 7,071,842 | B1 | 7/2006 | Brady, Jr. |
| 7,092,964 | B1 | 8/2006 | Dougherty et al. |
| 7,116,985 | B2 | 10/2006 | Wilson et al. |
| 7,206,568 | B2 | 4/2007 | Sudit |
| 7,219,303 | B2 | 5/2007 | Fish |
| 7,224,978 | B2 | 5/2007 | Zellner et al. |
| 7,224,987 | B1 | 5/2007 | Bhela et al. |
| 7,236,799 | B2 | 6/2007 | Wilson et al. |
| 7,237,201 | B2 | 6/2007 | Fish |
| 7,242,946 | B2 | 7/2007 | Kokkonen et al. |
| 7,245,925 | B2 | 7/2007 | Zellner |
| 7,266,443 | B2 | 9/2007 | Hirose |
| 7,315,259 | B2 | 1/2008 | Sacks |
| 7,352,322 | B2 | 4/2008 | Tsujimoto et al. |
| 7,412,400 | B1 | 8/2008 | Bhela et al. |
| 7,417,544 | B2 | 8/2008 | Artem et al. |
| 7,418,267 | B2 | 8/2008 | Karaoguz |
| 7,418,451 | B2 | 8/2008 | Leung et al. |
| 7,418,503 | B2 | 8/2008 | Zellner et al. |
| 7,426,436 | B1 | 9/2008 | Van Watermulen et al. |
| 7,532,900 | B2 | 5/2009 | Wilson et al. |
| 7,589,628 | B1 | 9/2009 | Brady, Jr. |
| 7,628,704 | B1 | 12/2009 | Uhlir et al. |
| 7,669,070 | B2 * | 2/2010 | Asmi ................... G06F 1/3203 713/310 |
| 7,761,414 | B2 | 7/2010 | Freedman |
| 8,046,721 | B2 | 10/2011 | Chaudhri et al. |
| 8,068,857 | B2 | 11/2011 | Wilson et al. |
| 8,070,608 | B2 | 12/2011 | Uhlir et al. |
| 8,074,172 | B2 | 12/2011 | Kocienda et al. |
| 8,126,889 | B2 | 2/2012 | Pitt |
| 9,014,973 | B2 | 4/2015 | Ruckart |
| 2001/0048449 | A1 | 12/2001 | Baker |
| 2002/0002504 | A1 | 1/2002 | Engel et al. |
| 2002/0035605 | A1 | 3/2002 | McDowell et al. |
| 2002/0065111 | A1 | 5/2002 | Otsuka et al. |
| 2002/0067308 | A1 | 6/2002 | Robertson |
| 2002/0077130 | A1 | 6/2002 | Owensby |
| 2002/0091568 | A1 | 7/2002 | Kraft et al. |
| 2002/0102993 | A1 | 8/2002 | Hendrey et al. |
| 2002/0111172 | A1 | 8/2002 | DeWolf et al. |
| 2002/0188589 | A1 | 12/2002 | Salmenkaita et al. |
| 2002/0198851 | A1 | 12/2002 | Hashimoto et al. |
| 2003/0055983 | A1 | 3/2003 | Callegari |
| 2003/0060214 | A1 | 3/2003 | Hendrey et al. |
| 2003/0078053 | A1 | 4/2003 | Abtin et al. |
| 2003/0093314 | A1 | 5/2003 | Leung et al. |
| 2003/0105719 | A1 * | 6/2003 | Berger ................ G06F 21/6245 705/51 |
| 2003/0191578 | A1 | 10/2003 | Paulauskas et al. |
| 2003/0207683 | A1 | 11/2003 | Lempio et al. |
| 2003/0220835 | A1 | 11/2003 | Barnes, Jr. |
| 2003/0229592 | A1 | 12/2003 | Florance et al. |
| 2004/0023666 | A1 | 2/2004 | Moon et al. |
| 2004/0036622 | A1 | 2/2004 | Dukach et al. |
| 2004/0111335 | A1 | 6/2004 | Black et al. |
| 2004/0192351 | A1 | 9/2004 | Duncan |
| 2004/0203561 | A1 | 10/2004 | Jakubowski |
| 2004/0203879 | A1 | 10/2004 | Gardner et al. |
| 2004/0203888 | A1 | 10/2004 | Mikan |
| 2004/0203901 | A1 | 10/2004 | Wilson et al. |

(56) References Cited

U.S. PATENT DOCUMENTS

| | | |
|---|---|---|
| 2004/0203918 A1* | 10/2004 | Moriguchi .............. G01C 21/26 455/456.1 |
| 2004/0203922 A1 | 10/2004 | Hines et al. |
| 2005/0027437 A1 | 2/2005 | Takenaga et al. |
| 2005/0027608 A1 | 2/2005 | Wiesmuller et al. |
| 2005/0079873 A1 | 4/2005 | Caspi et al. |
| 2005/0085952 A1 | 4/2005 | Park et al. |
| 2005/0096013 A1 | 5/2005 | Lehikoinen et al. |
| 2005/0096040 A1 | 5/2005 | Haberman et al. |
| 2005/0144291 A1 | 6/2005 | Frank et al. |
| 2005/0153729 A1 | 7/2005 | Logan et al. |
| 2005/0165788 A1 | 7/2005 | Yang et al. |
| 2005/0177416 A1 | 8/2005 | Linden |
| 2005/0202832 A1 | 9/2005 | Sudit |
| 2005/0227711 A1 | 10/2005 | Orwant et al. |
| 2005/0250517 A1 | 11/2005 | Fukui et al. |
| 2005/0261001 A1 | 11/2005 | Marley et al. |
| 2005/0272413 A1 | 12/2005 | Bourne |
| 2006/0020508 A1 | 1/2006 | Gorti |
| 2006/0022048 A1 | 2/2006 | Johnson |
| 2006/0046744 A1 | 3/2006 | Dublish et al. |
| 2006/0116817 A1 | 6/2006 | Salmre et al. |
| 2006/0135177 A1 | 6/2006 | Winterbottom et al. |
| 2006/0218151 A1 | 9/2006 | Adelman et al. |
| 2006/0253453 A1 | 11/2006 | Chmaytelli et al. |
| 2006/0258368 A1 | 11/2006 | Granito et al. |
| 2006/0277290 A1 | 12/2006 | Shank |
| 2007/0019587 A1 | 1/2007 | Okamoto et al. |
| 2007/0037610 A1 | 2/2007 | Logan |
| 2007/0042788 A1 | 2/2007 | Duan |
| 2007/0042789 A1 | 2/2007 | Moton et al. |
| 2007/0047479 A1 | 3/2007 | Shaffer et al. |
| 2007/0049287 A1 | 3/2007 | Dunn |
| 2007/0049288 A1 | 3/2007 | Lamprecht et al. |
| 2007/0049289 A1 | 3/2007 | Woo |
| 2007/0049292 A1 | 3/2007 | Emond |
| 2007/0049293 A1 | 3/2007 | Russell |
| 2007/0060171 A1 | 3/2007 | Sudit |
| 2007/0072619 A1 | 3/2007 | Wei et al. |
| 2007/0072621 A1 | 3/2007 | Mukkavilli et al. |
| 2007/0072625 A1 | 3/2007 | Fournier et al. |
| 2007/0072626 A1 | 3/2007 | Babu et al. |
| 2007/0077939 A1 | 4/2007 | Uematsu et al. |
| 2007/0077942 A1 | 4/2007 | Heaven et al. |
| 2007/0077943 A1 | 4/2007 | Hamilla |
| 2007/0080830 A1 | 4/2007 | Sacks |
| 2007/0082614 A1* | 4/2007 | Mock .................... H04W 88/02 455/41.2 |
| 2007/0082668 A1 | 4/2007 | Silver et al. |
| 2007/0082680 A1 | 4/2007 | Fish |
| 2007/0082681 A1 | 4/2007 | Kim et al. |
| 2007/0082682 A1 | 4/2007 | Kim et al. |
| 2007/0088490 A1 | 4/2007 | Sutardja |
| 2007/0091838 A1 | 4/2007 | Kobayashi et al. |
| 2007/0093257 A1 | 4/2007 | McDougall et al. |
| 2007/0096900 A1 | 5/2007 | Contractor |
| 2007/0099625 A1 | 5/2007 | Rosenfeld |
| 2007/0099627 A1 | 5/2007 | Kofol et al. |
| 2007/0105565 A1 | 5/2007 | Enzmann et al. |
| 2007/0105566 A1 | 5/2007 | Sharony et al. |
| 2007/0117571 A1 | 5/2007 | Musial |
| 2007/0117572 A1 | 5/2007 | Adam et al. |
| 2007/0117573 A1 | 5/2007 | Kennedy et al. |
| 2007/0124062 A1 | 5/2007 | Janky et al. |
| 2007/0129082 A1 | 6/2007 | Thacher |
| 2007/0129083 A1 | 6/2007 | Creamer et al. |
| 2007/0135136 A1 | 6/2007 | Ische |
| 2007/0142059 A1 | 6/2007 | Wang et al. |
| 2007/0142060 A1 | 6/2007 | Moton et al. |
| 2007/0149208 A1 | 6/2007 | Syrbe et al. |
| 2007/0149210 A1 | 6/2007 | McKiou et al. |
| 2007/0149211 A1 | 6/2007 | Dunn et al. |
| 2007/0149212 A1 | 6/2007 | Gupta et al. |
| 2007/0149213 A1 | 6/2007 | Lamba et al. |
| 2007/0149214 A1 | 6/2007 | Walsh et al. |
| 2007/0149216 A1 | 6/2007 | Misikangas |
| 2007/0155399 A1 | 7/2007 | Alberth et al. |
| 2007/0155400 A1 | 7/2007 | Madsen |
| 2007/0159322 A1 | 7/2007 | Campbell et al. |
| 2007/0161381 A1 | 7/2007 | Chen et al. |
| 2007/0161382 A1 | 7/2007 | Melinger et al. |
| 2007/0161401 A1 | 7/2007 | Sheynblat |
| 2007/0162582 A1 | 7/2007 | Belali et al. |
| 2007/0167170 A1 | 7/2007 | Fitchett et al. |
| 2007/0167171 A1 | 7/2007 | Bishop |
| 2007/0168127 A1 | 7/2007 | Zaruba et al. |
| 2007/0168524 A1 | 7/2007 | Chao et al. |
| 2007/0185768 A1 | 8/2007 | Vengroff et al. |
| 2007/0197217 A1 | 8/2007 | Sutardja |
| 2007/0233385 A1 | 10/2007 | Dicke et al. |
| 2008/0065408 A1* | 3/2008 | Salonen ................ G06Q 10/02 705/5 |
| 2008/0070593 A1* | 3/2008 | Altman ................ H04W 4/029 455/457 |
| 2008/0071749 A1 | 3/2008 | Schloter |
| 2008/0085689 A1 | 4/2008 | Zellner |
| 2008/0132251 A1 | 6/2008 | Altman et al. |
| 2008/0134088 A1 | 6/2008 | Tse et al. |
| 2008/0147546 A1 | 6/2008 | Weichselbaumer et al. |
| 2008/0172173 A1 | 7/2008 | Chang |
| 2008/0209332 A1 | 8/2008 | Chevsky et al. |
| 2008/0214161 A1 | 9/2008 | Jakl |
| 2008/0242231 A1 | 10/2008 | Gray |
| 2008/0248810 A1 | 10/2008 | Obradovich |
| 2008/0248815 A1* | 10/2008 | Busch ..................... H04L 67/18 455/456.5 |
| 2008/0252517 A1 | 10/2008 | Fuchs et al. |
| 2008/0266324 A1 | 10/2008 | Lynch et al. |
| 2008/0288545 A1 | 11/2008 | Hegedus et al. |
| 2008/0299900 A1 | 12/2008 | Lesyna |
| 2008/0316091 A1 | 12/2008 | Wigren et al. |
| 2009/0005127 A1* | 1/2009 | Frenger ............. H04W 52/0206 455/574 |
| 2009/0006480 A1 | 1/2009 | Fuchs et al. |
| 2009/0009397 A1 | 1/2009 | Taylor et al. |
| 2009/0009398 A1 | 1/2009 | Taylor et al. |
| 2009/0033553 A1 | 2/2009 | Tusjimoto et al. |
| 2009/0042584 A1 | 2/2009 | Nagata et al. |
| 2009/0043491 A1 | 2/2009 | Haatainen |
| 2009/0047972 A1 | 2/2009 | Neeraj |
| 2009/0063304 A1 | 3/2009 | Meggs |
| 2009/0082024 A1 | 3/2009 | Elliott |
| 2009/0098880 A1 | 4/2009 | Lindquist |
| 2009/0163226 A1 | 6/2009 | Karkaria et al. |
| 2009/0176475 A1 | 7/2009 | Salkini et al. |
| 2009/0278738 A1 | 11/2009 | Gopinath |
| 2010/0017874 A1 | 1/2010 | Piccinini et al. |
| 2010/0020776 A1 | 1/2010 | Youssef et al. |
| 2010/0042320 A1 | 2/2010 | Salmre et al. |
| 2010/0280874 A1 | 11/2010 | Thorn |
| 2010/0296441 A1 | 11/2010 | Barkan |
| 2011/0077046 A1 | 3/2011 | Durand et al. |
| 2011/0238517 A1 | 9/2011 | Ramalingam et al. |
| 2012/0046051 A1 | 2/2012 | Wilson et al. |
| 2012/0276926 A1 | 11/2012 | Pitt |
| 2012/0284105 A1 | 11/2012 | Li |

FOREIGN PATENT DOCUMENTS

| | | |
|---|---|---|
| JP | 2002354522 A | 12/2002 |
| JP | 2003161771 A | 6/2003 |
| JP | 2003344092 A | 12/2003 |
| JP | 2005323404 A | 11/2005 |
| JP | 2006153863 | 6/2006 |
| JP | 051869 | 3/2007 |
| JP | 2007189584 A | 7/2007 |
| JP | 2007189594 A | 7/2007 |
| JP | 2010539738 A | 12/2010 |
| KR | 1020050004662 | 1/2005 |
| KR | 1020050014940 | 2/2005 |

(56) References Cited

FOREIGN PATENT DOCUMENTS

| KR | 1020070053539 | | 5/2007 |
|---|---|---|---|
| WO | 2006070877 | A1 | 7/2006 |

OTHER PUBLICATIONS

"CardStar iPhone App Wrangles Multiple Membership Cards," written by Dong Ngo on May 15, 2009, http://news.cnet.com/8301-17938_105-10241727-1.html (last accessed May 22, 2013).
"Mobile Context Inference using Low-Cost Sensors", Evan Welbourne et al., Lecture Notes in Computer Science—LNCS, Springer, DE, vol. 3479, pp. 254-263, XP007915205, ISSN: 0302-9743 (Jan. 1, 2005).
"Modular Bayesian Networks for Inferring Landmarks on Mobile Daily Life", Keum-Sung Hwang et al., AI 2006: Advances in Artificial Intelligence Lecture Notes in Computer Science, Lecture Notes in Artificial Intelligence, LNCS, Springer, Berlin, DE, pp. 929-933, XP019052024, ISBN: 978-3-540-49787-5 (Jan. 1, 2006).
"Unique in the Crowd: The Privacy Bounds of Human Mobility," Yves-Alexandre de Montjoye, César A. Hidalgo, Michel Verleysen & Vincent D. Blondel, Scientific Reports 3, Article No. 1376 (Mar. 25, 2013).
"WatchMe: Communication and Awareness between members of a Closely-Knit Group", Natalia Marmasse et al., UbiComp 2004: Ubiquitous Computing: 6th International Conference, Nottingham, UK, Sep. 7-10, 2004, Lecture Notes in Computer Science, vol. 3205 (Nov. 2, 2004).
Apple Store POS Handhelds forum posts from Sep. 25, 2008, through Sep. 28, 2013, http://www.everythingcafe.com/forum/threads,apple-store-pos-handhelds.32824 (last accessed May 22, 2013).
Congvan Tran, "Notice of Allowance" dated Oct. 6, 2014 for U.S. Appl. No. 13/241,048.
Doan, "Non-Final Office Action" dated Nov. 1, 2013 for U.S. Appl. No. 13/923,722.
"Non-Final Office Action" dated Nov. 1, 2013 for U.S. Appl. No. 131923,722.
Extended European Search Report dated May 29, 2012, for European Application No. 08797761.7.
Final Office Action dated May 9, 2012, issued in U.S. Appl. No. 12/728,217.
Final Office Action issued in U.S. Appl. No. 12/728,216 dated Dec. 28, 2012.
Final Office Action issued in U.S. Appl. No. 12/728,217 dated Apr. 28, 2014.
Final Office Action issued in U.S. Appl. No. 13/052,193 dated Jun. 18, 2013.
Final Office Action issued in U.S. Appl. No. 13/923,722 dated Sep. 10, 2014.
Final Office Action received in U.S. Appl. No. 13/069,380 dated Apr. 22, 2013.
Indian Office Action issued in related Indian Application No. 1765/DELNP/2010 dated Aug. 7, 2017.
International Search Report and Written Opinion issued in International Application No. PCT/US2011/028566 dated Oct. 25, 2011.
International Search Report and Written Opinion issued in International Application No. PCT/US2008/072977 dated Jan. 30, 2009.
Japanese Office Action issued in divisional Japanese Appln. No. 2014-093925 dated Mar. 3, 2015.
Japanese Office Action issued in Japanese Application No. 2014-093925 dated Oct. 20, 2015.
Katherine Gager Kolosowski, "Final Office Action" dated Feb. 23, 2015 for U.S. Appl. No. 13/052,193.
Katherine Kolosowski-Gager, "Non-Final Office Action " dated Jul. 14, 2014 for U.S. Appl. No. 13/052,193.
Kiet M Doan, "Non-Final Office Action", dated Dec. 5, 2018, U.S. Appl. No. 15/956,924.
Kiet M Doan, "Notice of Allowance", dated Mar. 1, 2019, U.S. Appl. No. 15/956,924.
Kiet M Doan, "Restriction Requirement", dated Sep. 11, 2018, U.S. Appl. No. 15/956,924.
Kiet M. Doan, "Final Office Action" dated Sep. 19, 2016 for U.S. Appl. No. 14/619,136.
Kiet M. Doan, "Final Office Action", dated Jul. 5, 2017, U.S. Appl. No. 14/619,136.
Kiet M. Doan, "Non-Final Office Action" dated May 2, 2016 for U.S. Appl. No. 14/619,136.
Kiet M. Doan, "Non-Final Office Action" dated Nov. 24, 2015 for U.S. Appl. No. 14/619,136.
Kiet M. Doan, "Non-Final Office Action", dated Mar. 2, 2017 for U.S. Appl. No. 14/619,136.
Kiet M. Doan, "Notice of Allowance" dated Oct. 14, 2014 for U.S. Appl. No. 13/923,722.
Marshall M McLeod, "Final Office Action", dated Jul. 9, 2013 for U.S. Appl. No. 12/728,217.
Neeraj Chawla, "Notice of Allowance", dated Jan. 19, 2018, U.S. Appl. No. 14/619,136.
Non-Final Office Action for U.S. Appl. No. 12/728,217 dated Nov. 29, 2012.
Non-Final Office Action for U.S. Appl. No. 13/069,380 dated Nov. 29, 2012.
Non-final Office Action issued in U.S. Appl. No. 13/923,722 dated Apr. 14, 2014.
Non-Final Office Action dated Jul. 27, 2012, in U.S. Appl. No. 12/728,216.
Non-Final Office Action dated Oct. 30, 2013, received in U.S. Appl. No. 12/728,217.
Notice of Allowance issued in U.S. Appl. No. 12/728,216 dated Mar. 15, 2013.
Notice of Allowance issued in U.S. Appl. No. 14/056,477 dated May 18, 2016.
Notice of Allowance issued in Japanese Appln. Serial No. 2014-093925 dated Jan. 31, 2017.
Notice of Allowance dated Apr. 1, 2014, in JP Application No. 2010-521129, which corresponds to U.S. Appl. No. 11/838,876.
Nov. 22, 2011 International Search Report and Written Opinion issued in International Application No. PCT/US2011/028734.
Office Action (Non-Final) from U.S. Appl. No. 11/838,876 dated Mar. 24, 2011.
Office Action (Non-Final) from U.S. Appl. No. 11/838,876 dated Oct. 19, 2010.
Office Action (Non-Final) from U.S. Appl. No. 12/728,217 dated Dec. 20, 2011.
Office Action issued in U.S. Appl. No. 13/052,193 dated Jan. 2, 2013.
Office Action issued in Japanese Appln. Serial No. 2014-93925 dated Sep. 13, 2016.
Office Action issued in related Japanese Patent Application No. 2010-521129 dated Dec. 3, 2013. No translation.
Office Action issued in related Japanese Patent Application No. 2010-521129 dated Feb. 4, 2013. English translation provided on pp. 6-9.
Phouc Huu Doan, "Non-Final Office Action" dated Oct. 21, 2014 for U.S. Appl. No. 14/056,477.
Phuoc Huu Doan, "Final Office Action" dated Apr. 7, 2015 for U.S. Appl. No. 14/056,477.
Phuoc Huu Doan, "Final Office Action" dated Oct. 15, 2015 for U.S. Appl. No. 14/056,477.
Phuoc Huu Doan, "Non-Final Office Action" dated Feb. 8, 2016 for U.S. Appl. No. 14/056,477.
Hearing Notice for Indian Application No. 1765/DELNP/2010 dated Sep. 17, 2019.
Letter of Grant issued in Indian Application No. 1765/DELNP/2010 dated Sep. 9, 2020.
Review Petition Decision issued in Indian Application No. 1765/DELNP/2010 on Sep. 9, 2020.

* cited by examiner

Fig 2 – Push-Based Real-Time Location and Mobile Positioning System Overview

Fig 4 – Determining Real-Time Location and Managing GPS Power-Save-Mode Using PUSH-CLIENT and PUSH-SERVER

Fig 6 – Maintaining real-time location as a user moves to an indoor environment where GPS signal may not be available

Fig 8 – Detecting driving status using "In Car" detection methods

REAL-TIME LOCATION AND PRESENCE USING A PUSH-LOCATION CLIENT AND SERVER

CROSS REFERENCE TO RELATED APPLICATIONS

This application is a divisional of U.S. Nonprovisional patent application Ser. No. 15/956,924 filed Apr. 19, 2018, which is a continuation of U.S. Nonprovisional patent application Ser. No. 14/619,136 filed Feb. 11, 2015 (now issued as U.S. Pat. No. 9,980,231), which is a continuation of U.S. Nonprovisional patent application Ser. No. 13/923,722 filed Jun. 21, 2013 (now issued as U.S. Pat. No. 8,965,464), which is a continuation of U.S. Nonprovisional patent application Ser. No. 12/728,216 filed Mar. 20, 2010 (now issued as U.S. Pat. No. 8,489,111), which is a continuation-in-part (CIP) of U.S. Nonprovisional patent application Ser. No. 11/838,876 (now issued as U.S. Pat. No. 8,050,690). U.S. Nonprovisional patent application Ser. No. 12/728,216 also claims the benefit of U.S. Provisional Patent Application No. 61/162,263 filed Mar. 21, 2009. The subject matter of these earlier filed applications is hereby incorporated by reference in its entirety.

BACKGROUND

Location based services (LBS) targeted for consumers and enterprise applications have started gaining acceptance by the industry.

With the advancements in Global Positioning System (GPS) technology for mobile devices, the accuracy of mobile positioning systems has improved significantly, and consumer LBS applications such as mapping, local search, and real-time navigation are now available from mobile carriers and several other companies.

However, the ability to determine and to constantly maintain a current, real-time location is still not available on mobile devices, and mobile positioning systems and location based applications continue to rely on a pull or request based system, where an application or the system queries and gets a precise current location when it is required and requested.

In case of real-time applications such as turn-by-turn navigation, the current location is determined in real-time by requesting the location repeatedly and in frequent timing intervals for the duration such an application is in use.

However, such a pull or request based system does not maintain a precise current location of device at all times, and doing that in real-time imposes a significant drain of battery resources of the mobile device as well as imposes significant computing costs for the mobile positioning system.

Even in case of an E-911 scenario, if a device shuts down in an unforeseen event or a mishap, a precise current location may not be available, and only an approximate location of a user may be available for emergence response purposes. In such events, mobile carriers can determine an approximate location of the user based on cell-ID, however, a precise current or last known location that can only be determined by querying the device using a GPS or A-GPS solution, which may not be available if the device has already shut down.

In summary, to optimize the computing resources, the mobile positioning system operates as a pull or request based system, and a precise location is only determined when an application requests it. For applications where a precise and current location of a user is required at all times, the mobile positioning system must repeatedly query the device in order to maintain a current, real-time location of the user. With state of the art techniques, an application can specify the frequency or timing intervals of such requests, and can offload this process to another middleware service provider, which can notify the subscribing application(s) when the location changes. However, in order to maintain a precise, current location at all times, the GPS or A-GPS chipset embedded in the device has to be regularly polled, and the battery consumption continues to be a major constraint in enabling such real-time applications.

SUMMARY

In instances such as in an emergency response scenario or in a real-time location or presence application, where a current location of the mobile device is required in real-time, one aspect of the present invention is to provide such information using a push-based method without repeatedly sending location requests from the application(s) or the mobile positioning system.

For most mobile users, the typical location versus time graph is such that for a good part of the day, the user is stationary at selected locations such as home or work, and only during a small part of the day they are either mobile or at other locations. One aspect of the present invention is to manage the power saving modes of the embedded GPS or A-GPS chipset in the device such that while the device is stationary as determined by an accelerometer embedded in the device or by other activity detection methods in the operating system, the GPS or A-GPS chipset is set in a power saving mode.

Another aspect of the present invention is that while the device is determined to be stationary at a pre-determined location, one of the power saving modes of the embedded GPS or A-GPS system in the device is such that much of the power consuming circuits are shut down, and only the receive circuitry is put into the standby mode. Periodically, the receive signals are monitored, and only if there is a threshold change, the embedded system is re-started and the location recomputed.

In another aspect of the present invention, the frequency of location requests are set based on the speed of the mobile device, so that when the user is stationary, the embedded GPS or A-GPS chipset is put in the power saving mode for longer duration, and when moving at a faster speed, the location changes are determined at frequent time intervals.

In yet another aspect of the present invention, the positioning method and frequency of location requests is adjusted based on battery constraints of the mobile device.

By reducing location requests or queries sent by the application(s) or the mobile positioning system to the device, the invention enables such a solution with significantly reduced power consumption requirements for the GPS or A-GPS chipset embedded in the device, and reduces computing resource requirements in the mobile positioning system.

One aspect of the present invention is to determine the real-time location by maintaining a location profile of pre-determined locations of a user and enabling power save modes when user is determined to be at these locations. For instance, if a user is at their home or work, the embedded GPS or A-GPS chip can be set to sleep mode until the mobile positioning system detects a change in location based on other positioning methods such as cell-ID and/or timing advance.

Another aspect of the present invention is for an application to subscribe to a location server with user-controlled permissions in order to receive real-time location updates of the user using a push-location method, whereby the application receives location updates when the user's location changes. Further, the application or the user may specify additional criteria that may limit or restrict when to enable location tracking or to send location updates to the application. For example, an enterprise application may only receive location updates pertaining to the specified places of work.

BRIEF DESCRIPTION OF THE DRAWINGS

Foregoing aspects of the present invention will become better understood by referring to the following more detailed description and claims taken in conjunction with the accompanying drawings, wherein:

DETAILED DESCRIPTION OF THE EMBODIMENTS

Figure 1:
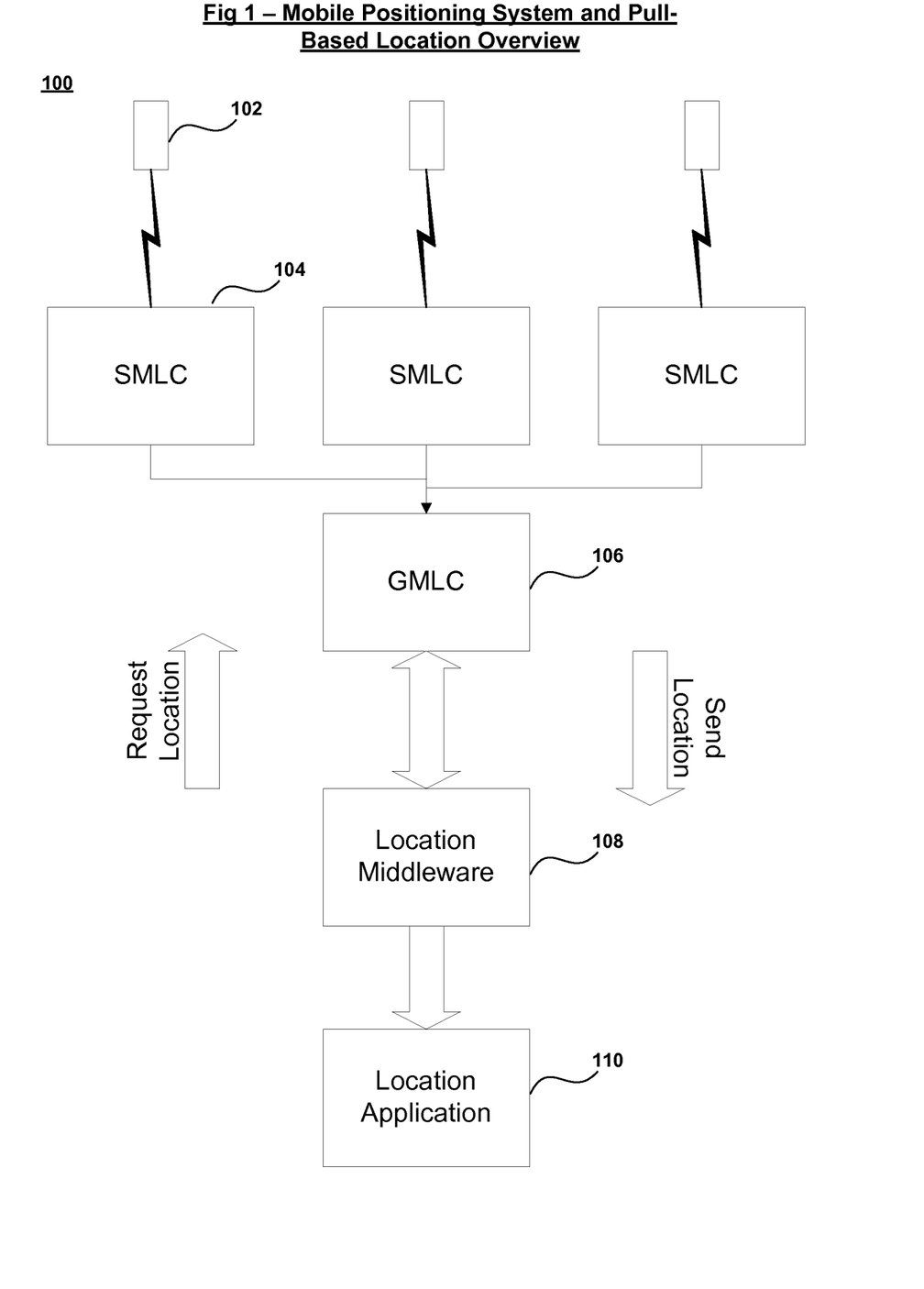
FIG. 1 is a block diagram of an exemplary pull-based location request system.

FIG. 1 provides a general description of a pull-based location request and response system 100, which is an overview of how the mobile positioning systems currently operate. In such a system, an application 110 requests location from a location server or a location middleware provider 108. The location middleware provider, in turn, requests location from the mobile positioning system, unless a current location is available from another recent request. In the case of a GSM based system, the mobile positioning system includes a Gateway Mobile Location Center (GMLC) 106 and a Serving Mobile Location Center (SMLC) 104, which in case of a Global Positioning System (GPS) capable device, requests location from the mobile device 102, unless a request was recently made by the system and a current location is already available in the mobile positioning system. After a valid location is determined by the device 102 that meets the accuracy criteria requested by the application 110, the location is sent to the SMLC 104, which further sends it to the GMLC 106. The GMLC, if the application has met the credentials for accessing the device's location, forwards the location to the location server or middleware provider 108, which then sends it the requesting application 110. In the case of such a pull-based request and response system, a location request has to be periodically made to refresh the current location of the user.

In another implementation of such a pull-based location request and response system, an application 110 can request the location directly from the GPS embedded in the mobile device 102, however, a location has to be continuously and periodically determined by the GPS to maintain a current location of the user. Further, if the application 110 requires such a real-time location be maintained on a location server on an operator or service provider network, such location updates have to be continuously transmitted using the mobile network, and take up a significant network traffic as well as drain the battery on the mobile device 102.

In another implementation of such a pull-based location request and response system, an application 110 can register with a location listener on the mobile device 102 that continuously requests location from the GPS embedded in the mobile device 102, which may eliminate the need for the application 110 to make such requests repeatedly, however, the listener is still periodically polling the GPS, and sending location updates to the subscribing application each time a location is determined by the GPS embedded in the mobile device 102.

Figure 2:
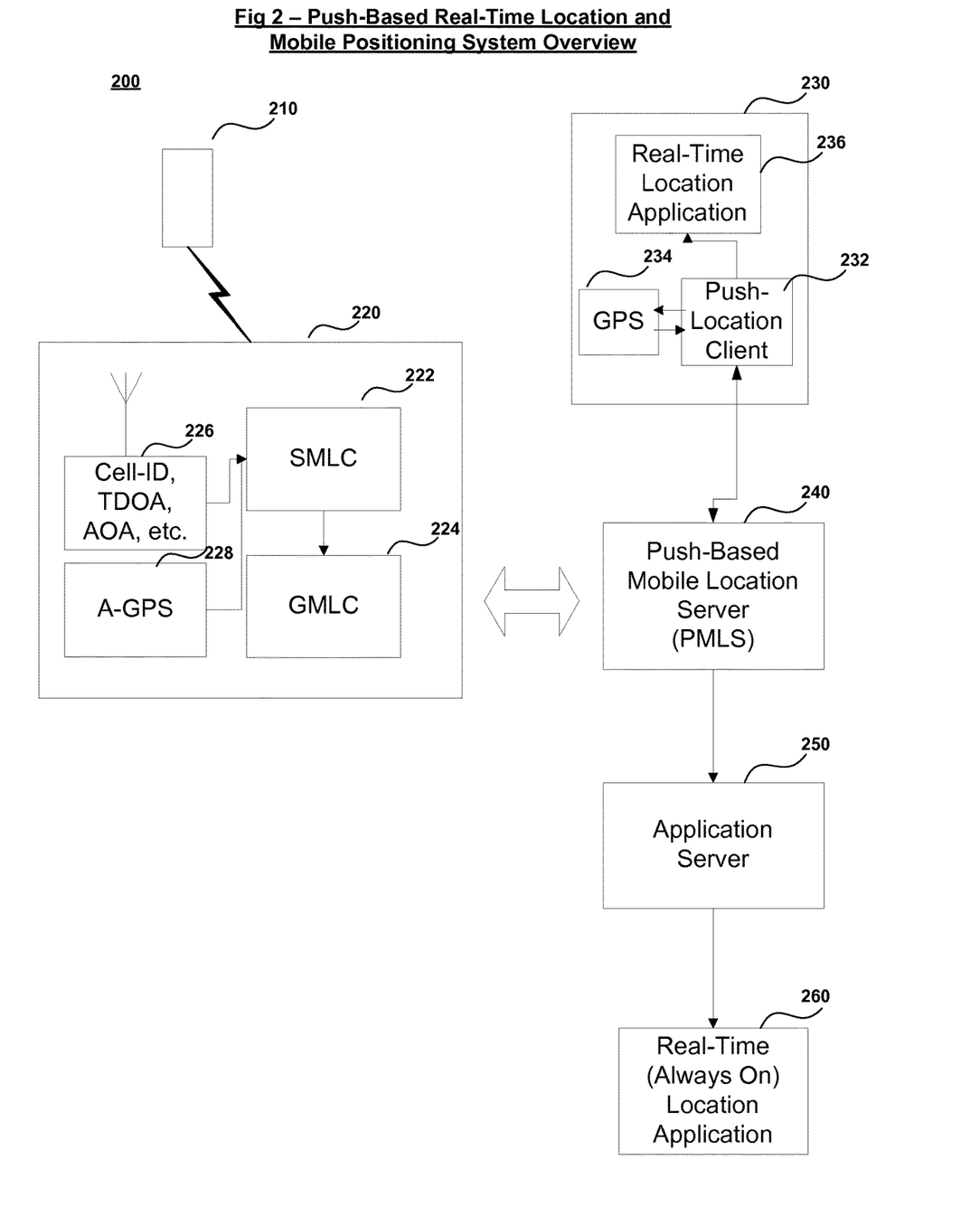
FIG. 2 is a block diagram of an exemplary push-based real-time location and mobile positioning system.

FIG. 2 provides an overview of the push-based real-time location system 200 proposed by the invention. In such an exemplary system, in addition to a standard mobile device 210 and a pull-based mobile positioning system 220 which was described in block diagram 100 earlier, the system includes a mobile device 230, push-based mobile location server (PMLS) 240, an application server 250, and one or more real-time location application(s) 260. The mobile device 230 includes a push-location client 232, an embedded GPS 234 and an embedded real-time location application 236. The push-location client 232 manages the GPS 234 and maintains the current location of the device, and provides location updates to the real-time location application 236, as well as to the push-based mobile location server 240. The location server 240 can provide location updates to subscribing application(s) such as real-time location application 260 either directly or through an application server 250. The key advantage of this system is that a real-time or an "always-on" location application is not required to request or receive continuous location updates from the location server in order to maintain the current location of the device, and instead location updates are sent the application intelligently when the location changes.

An exemplary real-time application 260 sends a subscription request with appropriate user-permissions and credentials, and the push-based mobile location server 250 first responds with the current location of the device, and subsequently sends location updates to the requesting application or middleware service provider as the location changes. The real-time application 260 or an embedded real-time application 236 are not required to repeatedly send location refresh requests to the server 250 or the GPS 234, and the push-location server similarly also doesn't need to send periodically repeated location refresh requests to the push-client 232 embedded in the mobile device in order to maintain a real-time location of the device.

Figure 3:
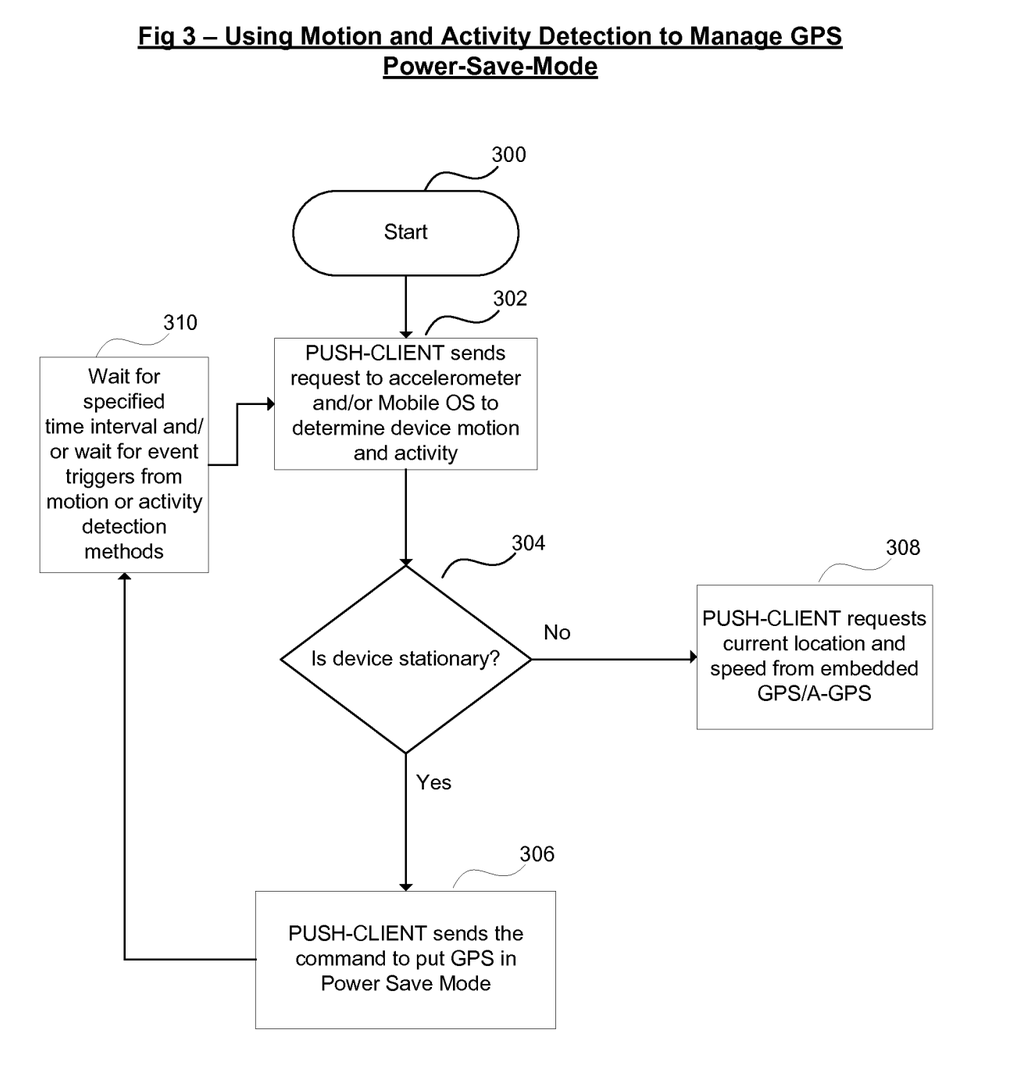
FIG. 3 is a block diagram of a push-client using motion and activity detection methods on a device to manage a GPS Power-save mode.
Figure 4:
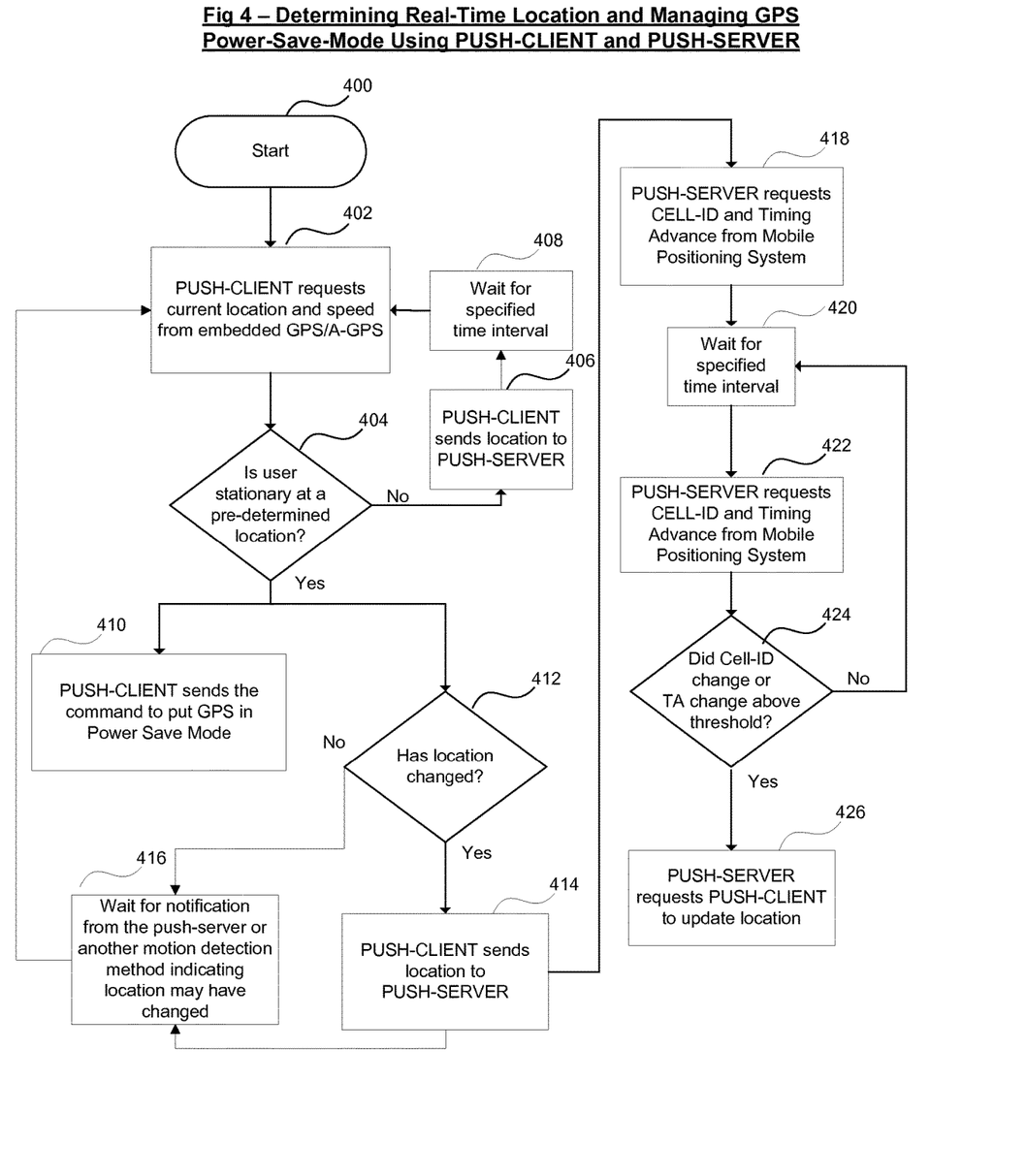
FIG. 4 is a block diagram of the mobile positioning system using the push-client and a push-server to determine a real-time location of the device and managing the GPS in a power-save-mode.

The push-location server 250 also maintains a profile of specified or pre-determined locations of the user, where the user is stationary for a specified period of time. When the user is at these pre-determined locations, the push-location server 250 can optionally receive and monitors cell-ID and timing advance information to detect a location change, and if a location is changed, and it hasn't received an update from the push-client, it can then send a refresh request to the push-client 232. During this time when the user is at these pre-specified or per-determined locations, the push-client can send a sleep command to the embedded GPS 234 for saving power consumption of the battery on the mobile device. When a location change is detected either by an activity detection method such as one described in block diagram 300, or by a notification from the push-server such as one described in block diagram 400, the push-client 232 can wake up the GPS chip 234 and request a location update.

FIG. 3 is an exemplary block diagram of the push-client maintaining a real-time location of the device by monitoring when the device is stationary, and only when motion is detected, or a user activity is detected on the device, a location refresh request is sent to the embedded GPS or A-GPS. In this exemplary implementation 300, in the block 302, the Push-Client 232 sends a request to the accelerometer embedded in the device and/or to the mobile operating system to receive the measurements from the accelerometer in order to determine motion of the device. In the decision block 304, when the device is considered to be stationary, the Push-Client sends the command to put GPS in the power save mode. If motion is detected, the Push-Client requests current location and speed from the embedded GPS 234. In the block 310, the Push-Client 232 waits for specified time interval or in case of accelerometers or other motion detection methods that can provide event triggers when motion is detected, Push-Client 232 repeats the above steps. Further, the motion or activity of a mobile device 230 may be detected by an accelerometer or other sensors embedded in the mobile device 230, or by other activity detection methods provided by the mobile operating system. In an advanced implementation, this method may be integrated within the GPS chip 230.

In another implementation, the GPS 234 may be embedded inside or integrated with another chip inside the mobile device. In yet another implementation, another global navigation satellite system (GNSS) such as Galileo may be used for determining location, or a different positioning method, such as Wi-Fi based positioning method, used for determining location.

FIG. 4 is a more detailed flowchart of the push-based location system described in 200. In this implementation 400, in the block 402, Push-Client 232 requests location and speed from embedded GPS 234. In the decision block 404, when the device is determined to be stationary at a pre-determined location within specified thresholds, in block 410, the Push-Client 232 puts GPS 234 in a power saving mode. Additionally, in the decision block 412, if it is determined that the location has changed compared to last known location, in block 414, Push-Client 232 sends a location update to Push-Server 240. If the location has not changed in decision block 412, as well as after sending the update to Push-Server in case of block 414, in the block 416, the Push-Client 232, working in conjunction with the push-server to monitor and detect if the device location has changed, waits for notification from either the motion or activity detection methods as described in block diagram 300, or in case, such an option is not available, from the push-server 300 indicating that the location may have changed.

Figure 7:
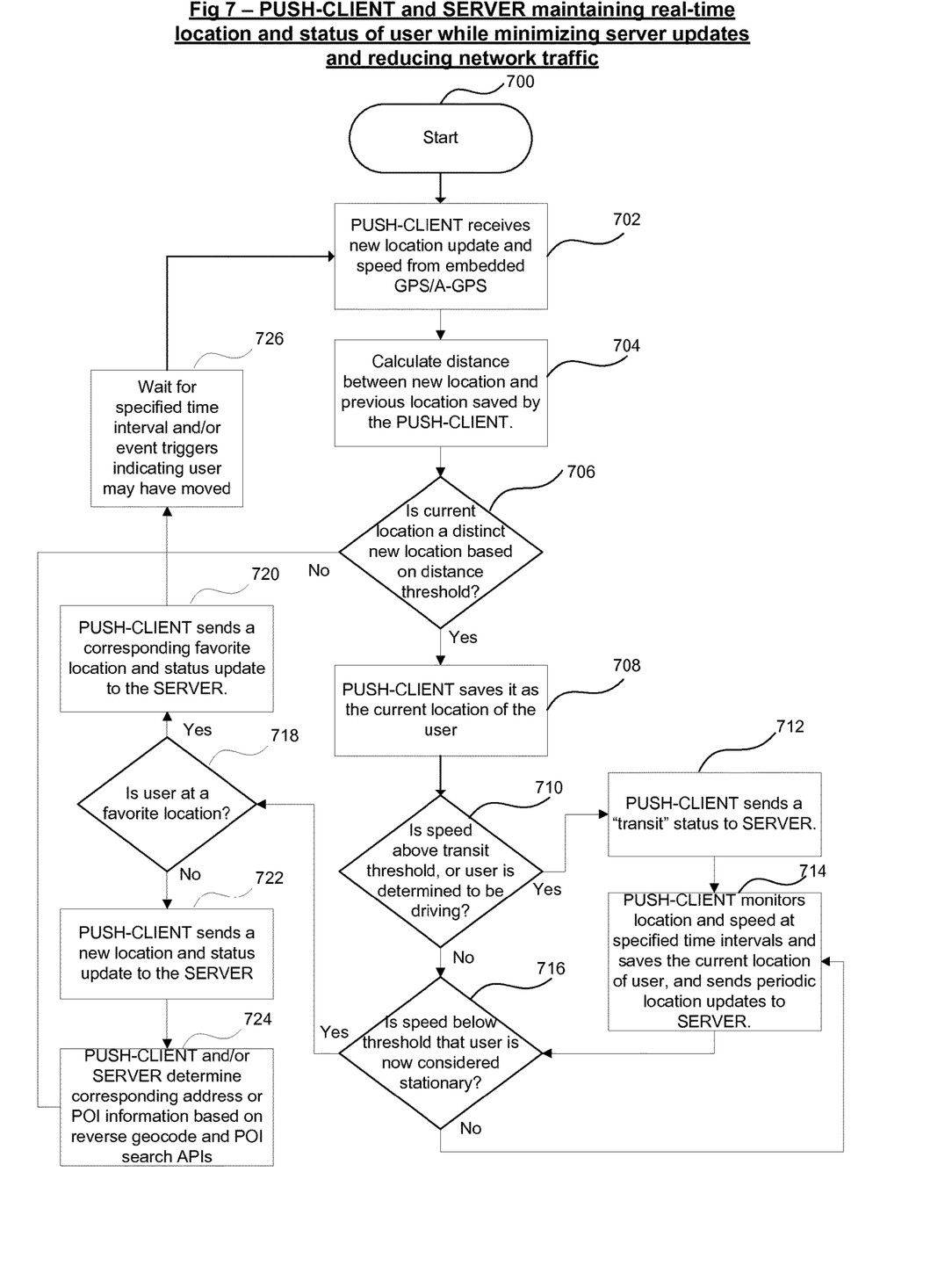
FIG. 7 is a block diagram of the push-client and the push-server maintaining the real-time location and status of an user while minimizing server updates and reducing network traffic.

When a notification or an event trigger is received, Push-Client 232 wakes up the GPS 234, and requests a location update from the GPS as in block 402. If in the decision block 404, the speed as determined by the GPS indicates that the device is in motion or at a new location, in block 406, the Push-Client sends a location update to the server, and waits for a specified time interval before requesting a location update from the GPS 234. To further optimize the location updates between Push-Client 232 and Push-Server 240, and to reduce the network traffic as the location changes when the user is in motion or when the user is at a new location, the details of blocks 402, 404, 406, 408 and 412 are further described in block diagram 700.

When the device 230 is stationary at a pre-determined location, in blocks 418, 420, 422, and 424 the push-location server 240 periodically requests and monitors cell-ID and timing advance information from the mobile positioning system 220. If the location is determined to have changed within specified thresholds, the push-location server sends a request to the push-client 232 to send an updated location. The push-client 232 then wakes up the GPS or A-GPS chip 234, and refreshes the current location.

When the push-client 232 requests location from the embedded GPS or A-GPS 234, it also requests the speed. If the device is considered to be moving, it requests the location repeatedly to maintain a real-time location. The time for repeating the request when the device 230 is in motion is calculated based on the speed of the device, such that a near real-time location is maintained by the push-client 232. When the device is determined to be stationary, the GPS 234 is sent the command to be put into a power-saving mode.

Figure 5:
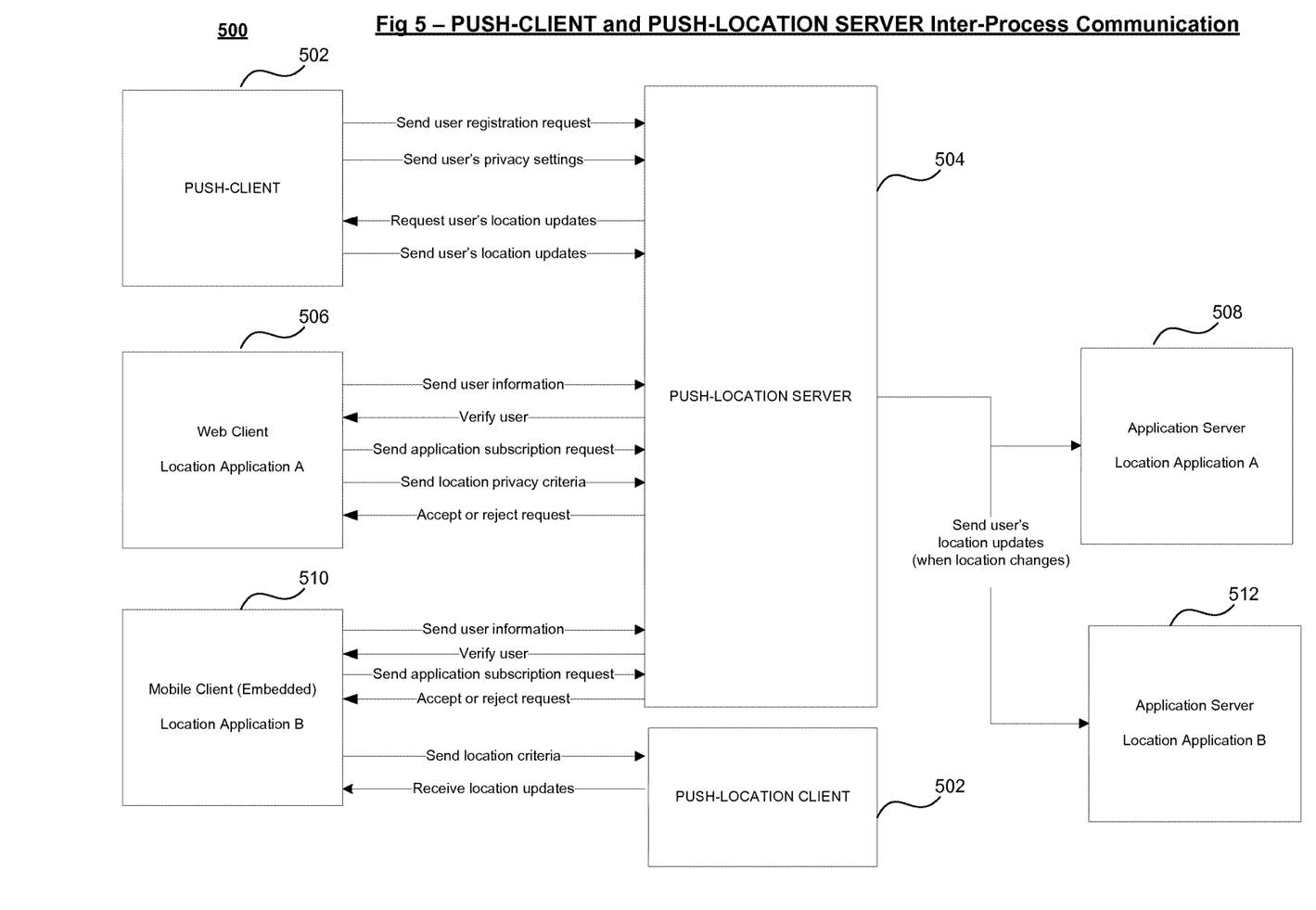
FIG. 5 is an overview of the push-client and the push-server inter-process communication.

FIG. 5 is an exemplary description of the inter-process communication between the push-client 502, and push-location-server 504 and an exemplary web based real-time application client 506, and application server 508, and another exemplary embedded real-time mobile application 510, such as a presence application, and a real-time application server 512 such as a presence server. A push-client 502 sends a registration request to the push-server, and sends the user's privacy settings to the server. Once the registration is done, the current location is sent, and subsequently location updates are sent to the push-server 504.

An exemplary web-based client application 506 and an application server 508 can subscribe to receive real-time location updates from the Push-Location Server 504, with user-permission and based on user-specified privacy settings. In the case of an exemplary embedded mobile application 510, which is a real-time location based presence application, the client application can subscribe to the Push-Location Server, and receive location updates on the mobile device directly from the Push-Client, while the Application Server 512, a Presence Server determines the presence status based on location profile, privacy settings, and location updates received from the push-location server and the status updates received from the Presence Client 510. The presence status is then shared with other users based on the privacy settings with respect to each user.

Figure 6:
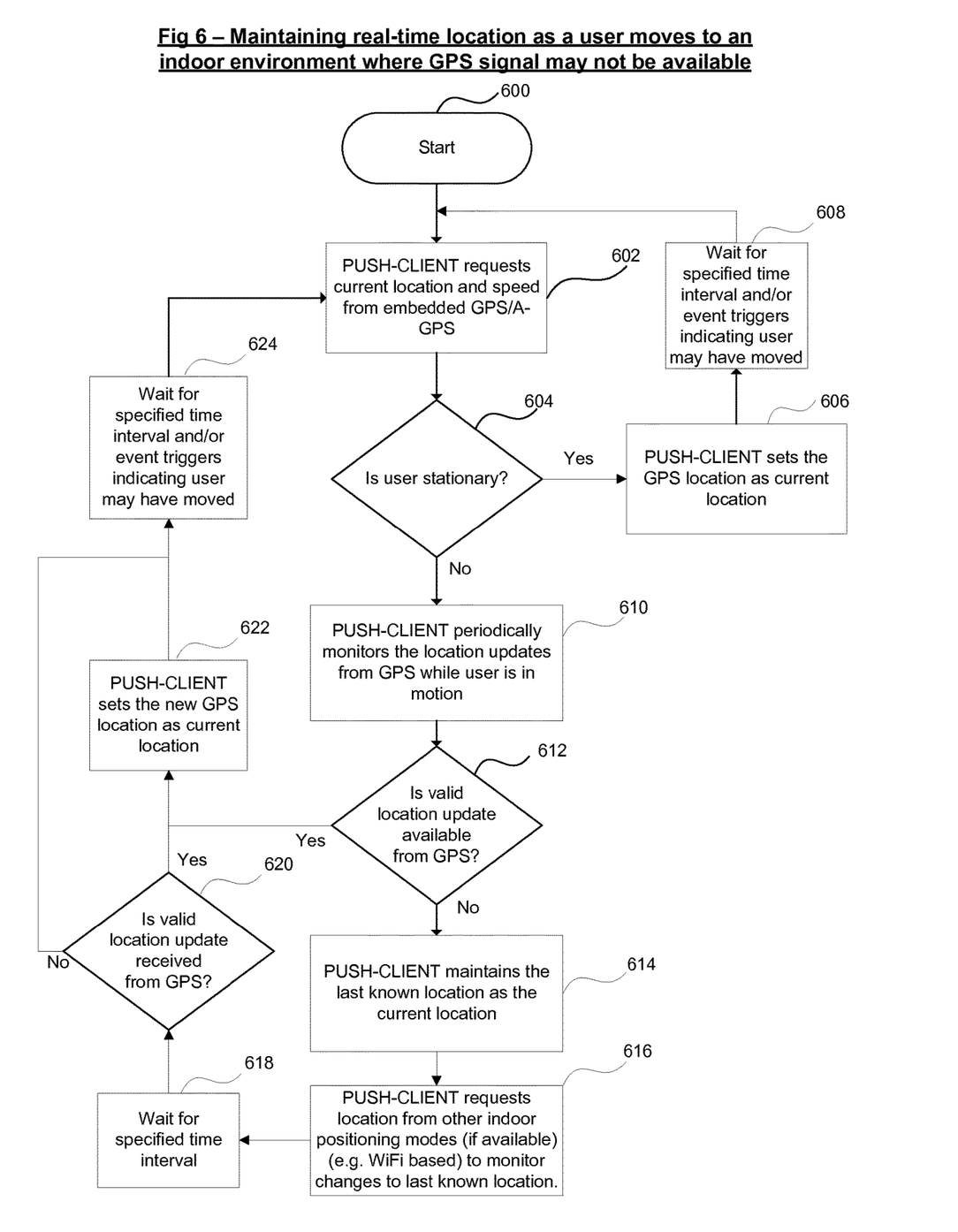
FIG. 6 is a block diagram of the push-client maintaining the real-time location as a user moves to an indoor environment where GPS signal may not be available.

FIG. 6 is a block diagram of a method used by the Push-Client 232 to maintain a real-time location as a user moves to an indoor environment where GPS signal may not be available. In this exemplary implementation 600, Push-Client 232 requests location and speed from the embedded GPS in block 602, and as described earlier, in blocks 604, 606, and 608, sets the received GPS location as the current location if the user is determined to be stationary, and waits for specified time interval and/or event triggers indicating that the user may have moved before requesting location from GPS again. In the decision block 604, if the user is determined to be in motion, Push-Client 232 periodically monitors the location updates from the GPS 234, and if a valid location update is received from the GPS 234, in block 622 it sets the new location as the current location. However, if in decision block 612, a valid location update is not received, as may be the case in an indoor location where GPS signal may not be available, in block 614, Push-Client 232 maintains the last known location as the current location, and in block 616, requests location from other indoor positioning modes, such as WiFi based location to monitor changes to last known location. In such a case, often the GPS may take longer to determine location or may not receive the location depending on the indoor environment. In block 618, the Push-Client waits for specified time interval, and if valid location is received, in block 620 and 622, it updates the current location, and until a GPS location is received it maintains the last known location as the current location.

FIG. 7 is a block diagram of the push-client and server maintaining a real-time location and status of user while minimizing server updates and reducing network traffic. In the block diagram 700, as described earlier in block diagram 400, in block 702, when the Push-Client 232 receives a new location update from the GPS 234, it determines if the location has changed, and if it is a distinct new location compared to last known location. In order to determine this, in block 704, it calculates distance between the new location and previously saved location. If in the decision block 706, the distance is greater than the minimum specified threshold for determining a distinct location, then in block 708, the Push-Client 232 saves it as the current location of the user.

Figure 8:
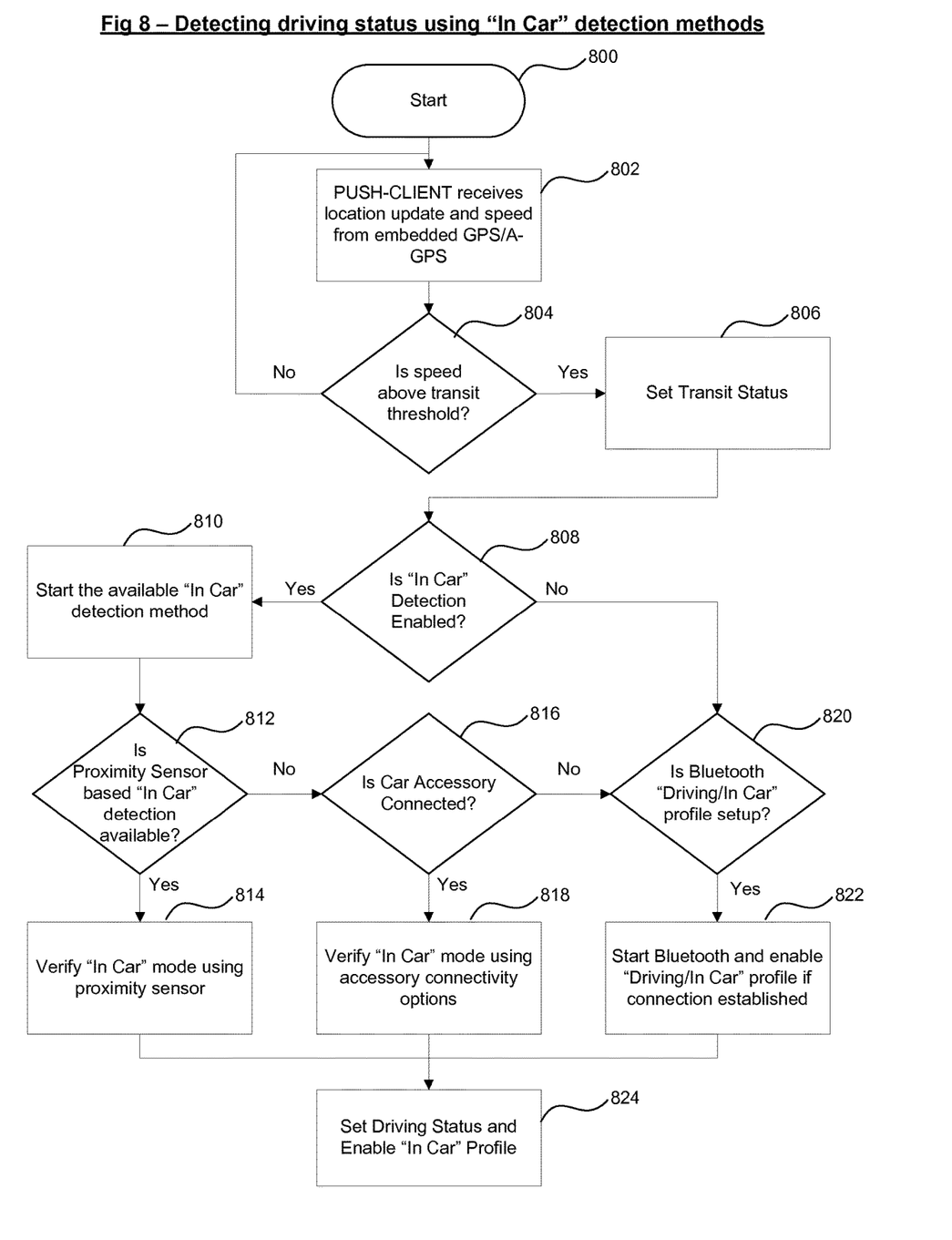
FIG. 8 is a block diagram of an exemplary system for detecting driving status using "In Car" detection methods.

In decision block 710, a determination is made if the speed is above the specified threshold for the user to be considered driving or in transit, and further, additional methods may be used to determine the driving status of the user, as described later in block diagram 800. If the user is determined to be in transit or driving, a transit message is sent to the Push-Server 240. Subsequently, in block 714, the Push-Client 232 periodically monitors the location and speed at specified time intervals, and saves the current location of the user, and periodically sends location updates to the Push-Server 240 so the server can maintain a real-time location of the user. In another implementation, the Push-Client 232 may only send the transit start and end points to the server to reduce the network traffic, and in yet another implementation, the Push-Client may intelligently determine when the heading or speed changes more than specified thresholds, and thereby only sending location updates when street information has likely changed, or when current location can't be interpolated by the server.

In decision block 716, if it is determined that the user is now considered stationary, in decision block 718, it is further determined if the user is at a pre-determined or a favorite location. If the user is at such a location, the corresponding favorite location and status update is sent to the Push-Server 240. However, if in decision block 718, user is determined to be at a new location, Push-Client 232 sends a location update to the Push-Server 240, and a corresponding address or POI information is determined by the server based on reverse geocode and POI search APIs. Subsequently, in block 726, the Push-Client 232 waits for specified time interval and/or event triggers indicating the user may have moved before requesting another update from the GPS 234.

FIG. 8 is a block diagram of an exemplary system for detecting driving status using "In Car" detection methods. In block diagram 800, in addition to determining transit status based on the speed threshold as described earlier and here again in blocks 802, 804 and 806, additional "In Car" methods may be used for detecting the driving status. In decision block 808, if an "In Car" method is enabled, the detection test is started in block 810. In one implementation, a proximity sensor may be used inside the car to detect the mobile device is inside the car. In the decision block 812, if a proximity sensor based detection method is available and enabled, in block 814, it is used to determine the "In Car" mode. In another implementation, connectivity status to an "In Car" accessory may be used for driving detection, as described in blocks 816 and 818. Additionally, if a user is determined to be in transit, and the device has a Bluetooth "In Car" profile setup, connection can be established using the Bluetooth profile to enable the driving profile as described in blocks 820 and 822. If the driving status is detected in blocks 814, 818, or 822, or assumed as the default option in block 806, the driving status is set and a corresponding transit update sent to the Push-Server 240. In another implementation, user can optionally specify the mode of transit, which is used as a default option when the user is determined to be in transit based on the speed threshold.

The invention claimed is:

1. A method, comprising:
determining, by a client of a mobile device, whether a mobile device is considered to be driving or in transit based on a speed at which the mobile device is traveling;
when the client of the mobile device determines that the mobile device is driving or in transit:
sending, by the client, a transit message to a server, and monitoring a current location and speed of the mobile device, by the client; and
when the client detects that the speed of the mobile device has fallen below a speed threshold, and the mobile device is considered to be at an end point of a street along the driving or transit, sending the current location, the speed, and a heading at a start point and the end point to the server, by the client.

2. The method of claim 1, further comprising:
when the user is at the end point:
sending a sleep command to an embedded positioning system of the mobile device, and
initiating a power saving mode that reduces consumption of battery power by the mobile device.

3. The method of claim 1, further comprising:
determining an address of the end point, by the client of the mobile device or the server, based on location coordinates.

4. The method of claim 1, further comprising:
when the end point is a business or point of interest (POI) location, updating a location status of the mobile device with information corresponding to the business or the POI; and
when the end point is not at a business or a POI location, determining the location status based on geographical area level information or a sharing level status of a user.

5. The method of claim 1, further comprising:
maintaining recently visited end point locations where the mobile device is determined to be stationary for a specified period of time.

6. The method of claim 1, further comprising:
maintaining a profile of specified and/or pre-determined locations of the mobile device where the mobile device is stationary for a specified period of time.

7. The method of claim 6, further comprising:
enabling a power saving mode when the mobile device is determined to be at one of the specified and/or pre-determined locations of the profile.

8. The method of claim 6, further comprising:
assigning, by the mobile device, a privacy level of a plurality of privacy levels for sharing corresponding location information with each application specified by a user.

9. The method of claim 8, wherein
at a first privacy level, no location information is shared,
at a second privacy level or two or more intermediate privacy levels, location information is shared based on privacy criteria, and
at a third or final privacy level, all location information is shared with selected users and/or applications at all times.

10. The method of claim 1, further comprising:
determining a presence status of the mobile device based on a location profile, privacy settings of a plurality of users, and location updates received from a server; and
sharing the presence status with the plurality of users or one or more applications, wherein
the presence status for a given user is based on the privacy settings for that respective user.

11. The method of claim 1, wherein the client only sends start and end points of the driving or transit to the server, thereby reducing server updates from the mobile device while driving or in transit, and thus, reducing network traffic and improving battery performance of the mobile device.

12. The method of claim 1, further comprising:
determining, by the client, when a heading or the speed of the mobile device changes more than a heading threshold or a speed change threshold, respectively; and
sending a location update to the server, by the client, when the heading threshold or the speed change threshold are exceeded.

13. The method of claim 1, further comprising:
determining, by the client, when street information has likely changed or the current location cannot be interpolated by the server; and
sending the current location to the server, by the client, when the street information has likely changed or the current location cannot be interpolated by the server.

14. A method, comprising:
determining, by a client of a mobile device, whether a mobile device is considered to be driving or in transit based on a speed at which the mobile device is traveling; and
when the client of the mobile device determines that the mobile device is driving or in transit:
monitoring a current location and speed of the mobile device, by the client,
when the client detects that the speed of the mobile device has fallen below a speed threshold, and the mobile device is considered to be at an end point of the driving or transit, sending the end point to the server, by the client, and
maintaining, by the client, recently visited end point locations where the mobile device is determined to be stationary for a specified period of time.

15. The method of claim 14, further comprising:
maintaining a profile of specified and/or pre-determined locations of the mobile device where the mobile device is stationary for a specified period of time; and
enabling a power saving mode when the user is determined to be at one of the specified and/or pre-determined locations of the profile.

16. The method of claim 15, further comprising:
assigning a privacy level of a plurality of privacy levels to each of the specified and/or pre-determined locations, wherein
at a first privacy level, no location information is shared, and
at a second privacy level or two or more intermediate privacy levels, location information is shared based on privacy criteria, and
at a third or final privacy level, all location information is shared with selected users and/or applications at all times.

17. The method of claim 14, further comprising:
determining a presence status of the mobile device based on a location profile, privacy settings of a plurality of users, and location updates received from a server; and
sharing the presence status with the plurality of users, wherein
the presence status for a given user is based on the privacy settings for that respective user.

18. A method, comprising:
determining, by a client of a mobile device, whether a mobile device is considered to be driving or in transit based on a speed at which the mobile device is traveling; and
when the client of the mobile device determines that the mobile device is driving or in transit:
sending, by the client, a transit message to a server, and
monitoring a current location and speed of the mobile device, by the client, wherein
the client only sends start and end points of the driving or transit to the server, thereby reducing server updates from the mobile device while driving or in transit, and thus, reducing network traffic and improving battery performance of the mobile device.

19. The method of claim 18, further comprising:
determining, by the client, when a heading or the speed of the mobile device changes more than a heading threshold or a speed change threshold, respectively; and
sending a location update to the server, by the client, when the heading threshold or the speed change threshold are exceeded.

* * * * *